June 1, 1971     S. P. IVANOV ET AL     3,582,329
METHOD OF MAKING LENTICULAR SCREENS
Filed May 25, 1965
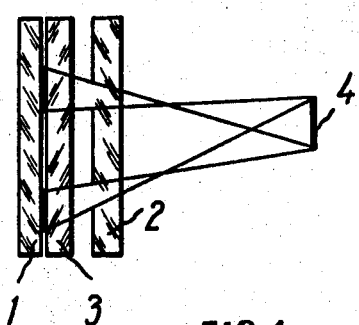
FIG.1
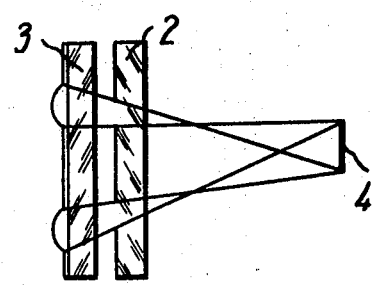
FIG.2
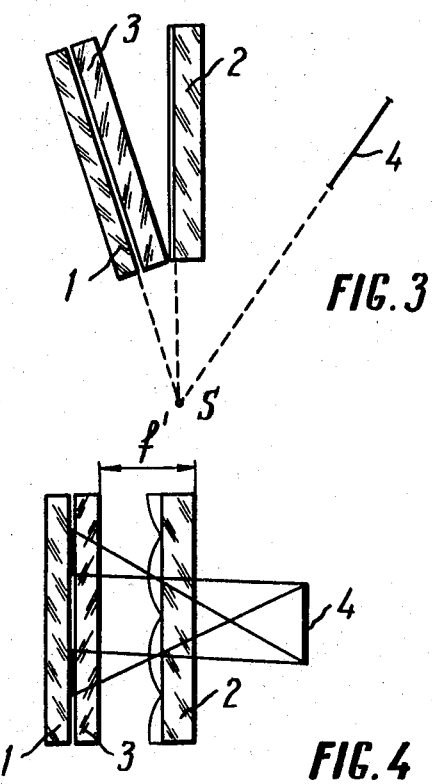
FIG.3
FIG.4
INVENTORS
S. P. IVANOV ET AL
By Glascock, Downing & Seebold
ATTORNEYS

United States Patent Office 3,582,329
Patented June 1, 1971

---

3,582,329
METHOD OF MAKING LENTICULAR SCREENS
Semen Pavlovich Ivanov, Moscow, and Ljudmila Vladimirovna Akimakina, Moskovskaja Obl., U.S.S.R., assignors to Vsesojuzny Nauchno-Issledovatelsky Kinofotoinstitut, Moscow, U.S.S.R.
Filed May 25, 1965, Ser. No. 458,530
Int. Cl. G03f 5/02, 5/12
U.S. Cl. 96—35
6 Claims

ABSTRACT OF THE DISCLOSURE

A method of manufacturing a high-quality lenticular screen of preset cross-section and having an opaque layer between the lens elements wherein a first transparent plate having a light-sensitized colloid layer is provided, which layer contacts a second transparent plate upon which the lenticular screen is to be made. A negative of a workpiece is printed on the light-sensitized layer by passing light from a light source of uniform intensity through an initial screen and the second transparent plate. This so formed negative of the workpiece is stained to form non-transparent areas in the places of the future lenses. The second transparent plate is coated with a light-sensitized colloid and the coated plate is matched with the stained negative of the workpiece on the first transparent plate. A positive image of the workpiece is printed on the coated second plate. The positive image of the workpiece is then stained to form non-transparent layers between the transparent areas for the lenses. The positive image of the workpiece is again coated with a light-sensitized colloid and microlenses are formed in the transparent areas by exposing the coated positive image of the workpiece to a source of light of uniform intensity through the initial screen.

---

The present invention relates to methods of making lenticular screens consisting of plano-convex microlenses with the spherical or aspherical surface or of microlenses with the conical or cylindrical surface. The interspaces between them in such a screen are covered with a non-transparent light-sensitive layer and the refractional surface of the microlenses is made of a transparent sensitized-to-light colloid and has a predetermined cross-section.

Mehods of making lenticular screens hitherto known in the art provide for manufacturing lenticular screens with unblackened interspaces between the lens elements. Such screens are manufactured by various photomechanical technological procedures in which the refractional surface of microlenses is shaped in accordance with a preset cross-section of a colloid sensitized to light applied to the surface of a glass plate. Unblackened interspaces between the lens elements pass a considerable portion of light to the focal plane, thus creating a parasitic exposure of the screen image and thereby adversely affecting its properties (contrast, separation and the like).

A method is known (in compliance with the Author's Certificate of the U.S.S.R. No. 84 103) involving photo-mechanical procedures and providing for blackening the interspaces between the lenses; however, this method does not provide for shaping or forming the refractional surface of microlenses of the screen in accordance with a preset cross-section.

According to this method an image of a so-called workpiece is first printed on a transparent plate, which is a screen with round transparent apertures in an opaque (non-transparent) layer. The shaping of lens elements in the transparent areas of the workpiece, after a second layer of colloid sensitized to light has been applied thereto, is effected only due to surface tension, and therefore it is impossible to obtain lenticular screens with a preset cross-section of microlenses.

It is an object of the present invention to eliminate the above disadvantages.

The primary object of the invention is to develop such method of manufacturing lenticular screens made of sensitized-to-light colloid, which will allow the printing of screens with a predetermined cross-section of microlenses and with opaque (non-transparent) spaces therebetween. Said objects are achieved by the method proposed herein, according to which an additional transparent plate with an emulsion layer is provided and the latter is brought into contact with the transparent plate of the lenticular screen to be made. Prior to coating said second plate with sensitized-to-light colloid, by means of a light source of uniform intensity through the initial screen a negative of the workpiece is printed on said additional plate. The negative, after being stained, has non-transparent areas in the places of future lenses. Then the transparent plate of the future lenticular screen is coated with sensitized-to-light colloid and, it being matched with the stained layer of the workpiece negative, the workpiece is printed for the future lenses on the plate of the future lenticular screen, which, after being stained, has a non-transparent or opaque layer between the transparent areas intended for the future lenses of the screen. The ready workpiece is then coated with a second layer of sensitized-to-light colloid intended for shaping lens elements in the transparent areas of the workpiece with the help of the initial screen and a light source with a preset light distribution corresponding to the cross-section of the future lenses.

In the following description the nature of the present invention is explained in the disclosure of its exemplary embodiments given by way of illustration to be taken in conjunction with the accompanying drawings in which:

FIG. 1 diagrammatically represents the printing of the workpiece negative on the plate through the initial light-absorbing screen;

FIG. 2 diagrammatically represents the printing-in of the lens elements into the interspaces of the workpiece through the same initial screen;

FIG. 3 diagrammatically represents the printing of the workpiece negative of the future lenticular screen; and FIG. 4 diagrammatically represents the printing of the workpiece negative through the initial lenticular screen.

When making lenticular screens with a preset cross-section of the microlenses and blackened interspaces therebetween, first (FIG. 1) a negative of a workpiece is printed on an additional transparent plate 1 coated with colloid sensitized to light. The printing of the negative of the workpiece through the initial light-absorbing screen 2 by means of a light source of uniform intensity is effected in such a way that the layer of the sensitized-to-light colloid is brought into contact with a transparent plate 3 whereupon the lenticular screen will be printed later. After the development of the layer on plate 1 and its staining with a black dye, the negative of the workpiece has round opaque areas of the layer on the transparent plate, which define the places of future microlenses on plate 3.

After the application of the sensitized-to-light colloid to plate 3, an image of the workpiece is printed thereupon from the negative of the workpiece by means of contact printing. After the layer on plate 3 has been developed and after staining it with a black dye the image of the workpiece on plate 3 has round transparent areas in the opaque layer. For printing the screen microlenses into the transparent areas of the image of the workpiece, plate 3 is coated again with sensitized-to-light colloid and placed so as to occupy the same position with respect to the initial screen 2 (FIG. 2) which it occupied when the negative of the workpiece was being printed. Microlenses of the screen are printed exactly into the transparent areas of the image of the workpiece through the initial screen 2 with the help of a light source provided with diaphragm 4 which in this case has a preset (in conformity with the cross-section of the lenses) distribution of intensity.

The exact matching of the contours of microlenses of the screen and the transparent areas of the image of the workpiece is highly important, since even slight error in the accuracy of matching will bring about the passage of parasitic light beams through the mismatched areas, and thus a deterioration in the optical properties of the screen (contrast, resolution, capacity, separation, useful angle of view, and the like). This problem is made still more complicated by the fact that in accordance with the conventionally adopted photomechanical procedure lenses are printed by the projection method through the transparent plate which introduces a certain curvature of the path of inclined light beams. Even in the case of the most accurate manufacture of the plates, it is actually impossible to guarantee their absolute identity as to the thickness, wedge-like shape, the degree of deviation of the plate surfaces from the geometrical plane, etc. Therefore, without the use of the method of the present invention, which is characterized in that the negative of the workpiece is printed through the transparent plate 3, it is practically impossible to manufacture an image of a workpiece fit for printing lenses exactly into the apertures thereof.

When manufacturing lenticular screens comprising plano-convex microlenses with a spherical or aspherical surface, first the negative of the workpiece is printed with the help of a light source with uniform intensity, provided with a round diaphragm. When printing-in lens elements before the source of light with uniform intensity a device with a rotary diaphragm is placed, said device being made in accordance with the Author's Certificate of the U.S.S.R. No. 127909.

The diaphragms are made with apertures in which polar coordinates of the points of the contour correspond to the orthogonal coordinates of the points of the preset cross-section of the plano-convex microlenses of the screen.

During exposure the diaphragm rotates.

When manufacturing lenticular screens, comprising cylindrical or conical lenses, first the negative of the workpiece is printed with the help of a source of light with uniform intensity provided with a diaphragm of a rectangular or a trapesoidal shape respectively. When printing-in microlenses into the apertures of the image of the workpiece, a stationary diaphragm is placed in front of the source of light of uniform intensity, the cut of said stationary diaphragm, in accordance with the Author's Certificate of the U.S.S.R. No. 69195, being determined by the cross-section of the microlenses to be made.

When printing-in the lens elements into the apertures of workpiece of the perspective screen (FIG. 3), comprised of conical elements, the planes of diaphragm 4 of the light source, of initial screen 2 and of the emulsion layers of the plates should intersect on one straight line passing through the point S at which the perspective screen elements converge.

When printing screens whose elements lie within an orthogonal or hexagonal system of coordinates, said planes are set parallel with respect to each other.

It is most expedient to use a lenticular screen as initial screen 2. In this case (see FIG. 4) the light-sensitive layers of additional plate 1 and plate 3 are disposed in the focal plane of initial screen 2.

With the use of such mode of printing there may be manufactured lenticular screens featuring higher light power of the microlenses and high accuracy of matching the bases of the lenss with the apertures in the workpiece.

What we claim is:

1. A method of making a high-quality lenticular screen of preset cross-section having an opaque layer between the lens elements comprising the steps of contacting a first transparent plate having an emulsion layer with a second transparent plate on which the lenticular screen is to be made; obtaining a negative of a workpiece on the emulsion layer of said first transparent plate through an initial screen by exposing said emulsion layer to a source of light of uniform intensity; staining said negative of the workpiece to form non-transparent areas in the places of future lenses; then coating said second transparent plate with a sensitized-to-light colloid; matching said coated second transparent plate with said stained negative of the workpiece and printing a positive image of the workpiece on said coated second transparent plate; staining said positive of the workpiece to form non-transparent layers between the transparent areas for the lenses; then coating said positive image of the workpiece with a second layer of sensitized-to-light colloid and forming microlenses in said transparent areas by exposing said coated positive image of the workpiece to a source of light of uniform intensity through said initial screen.

2. A method as claimed in claim 1 wherein said initial screen is a light-absorbing screen.

3. A method as claimed in claim 1 wherein said initial screen is a lenticular screen and said negative of the workpiece is formed on said first transparent plate while it and said second transparent plate are in the focal plane of said initial lenticular screen.

4. A method as claimed in claim 1 wherein said source of light of uniform intensity is provided through a round diaphragm when printing said negative of the workpiece when making lenticular screens comprised of plano-convex lenses with a spherical or aspherical surface.

5. A method as claimed in claim 1 wherein said source of light of uniform intensity is provided through a diaphragm of rectangular shape when printing the negative of the workpiece when making lenticular screens comprised of lenses with a cylindrical surface.

6. A method as claimed in claim 1 wherein said source of light of uniform intensity is provided through a diaphragm of trapezoidal shape when printing the negative of the workpiece when making lenticular screens comprised of lenses with a conical surface.

References Cited

UNITED STATES PATENTS

| 1,849,036 | 3/1932 | Ernst | 96—116 |
| 2,876,099 | 3/1959 | Schenk | 96—116 |

FOREIGN PATENTS

| 637,338 | 2/1962 | Canada | 96—116 |
| 682,853 | 11/1952 | Great Britain | 96—81 |
| 69,195 | 12/1942 | U.S.S.R. | |
| 84,103 | 4/1948 | U.S.S.R. | |
| 127,909 | 11/1960 | U.S.S.R. | |

RONALD H. SMITH, Primary Examiner

U.S. Cl. X.R.

96—45 116